(12) United States Patent
Vernon et al.

(10) Patent No.: US 10,363,732 B2
(45) Date of Patent: Jul. 30, 2019

(54) SYSTEMS AND METHODS FOR GENERATING SLICE FILES FROM NATIVE CAD GEOMETRIES

(71) Applicant: Honeywell Federal Manufacturing & Technologies, LLC, Kansas City, MO (US)

(72) Inventors: Gregory J. Vernon, Kansas City, MO (US); Rachel Cramm Horn, Kansas City, MO (US); John Porter, Kansas City, MO (US)

(73) Assignee: Honeywell Federal Maufacturing & Technologies, LLC, Kansas City, MO (US)

( * ) Notice: Subject to any disclaimer, the term of this patent is extended or adjusted under 35 U.S.C. 154(b) by 339 days.

(21) Appl. No.: 15/243,583

(22) Filed: Aug. 22, 2016

(65) Prior Publication Data
US 2018/0052433 A1 Feb. 22, 2018

(51) Int. Cl.
*B33Y 50/00* (2015.01)
*G05B 19/4099* (2006.01)

(52) U.S. Cl.
CPC .......... *B33Y 50/00* (2014.12); *G05B 19/4099* (2013.01); *G05B 2219/49008* (2013.01); *G05B 2219/49019* (2013.01); *Y02P 90/265* (2015.11)

(58) Field of Classification Search
CPC ...................................................... B33Y 10/00
See application file for complete search history.

(56) References Cited

U.S. PATENT DOCUMENTS

2015/0328839 A1 11/2015 Willis et al.
2018/0186076 A1* 7/2018 Backer ................... B33Y 80/00

OTHER PUBLICATIONS

Webpage; Materialise Magics (software) http://www.materialise.com.
Webpage; Abaqus CAE (software) http://www.3ds.com/products-services/simulia/products/abaqus/abaquscae/.
Webpage; Cubit (software) https://cubit.sandia.gov.

* cited by examiner

*Primary Examiner* — Yu-Hsi D Sun
(74) *Attorney, Agent, or Firm* — Hovey Williams LLP

(57) ABSTRACT

A system and method for improving the production of objects with fully defined CAD models by generating CAD slice files from the native CAD geometries for use by AM machines. An electronic processing element receives the CAD model having a native and/or neutral format with metadata, determines a desired resolution, slices the CAD model to create the slice files having a slice format (e.g., point, edge, surface, volume) and retaining the metadata, and evaluates the slice files to determine whether the resolution has been achieved. If so, the slice files are sent to the AM machine. If not, a new desired resolution is determined and the CAD model is re-sliced, which may include combining the slice files to regenerate the CAD model. A support structure for the object may be analyzed, and if distortion is predicted, a modified CAD model may be created and sliced to create modified slice files.

20 Claims, 13 Drawing Sheets

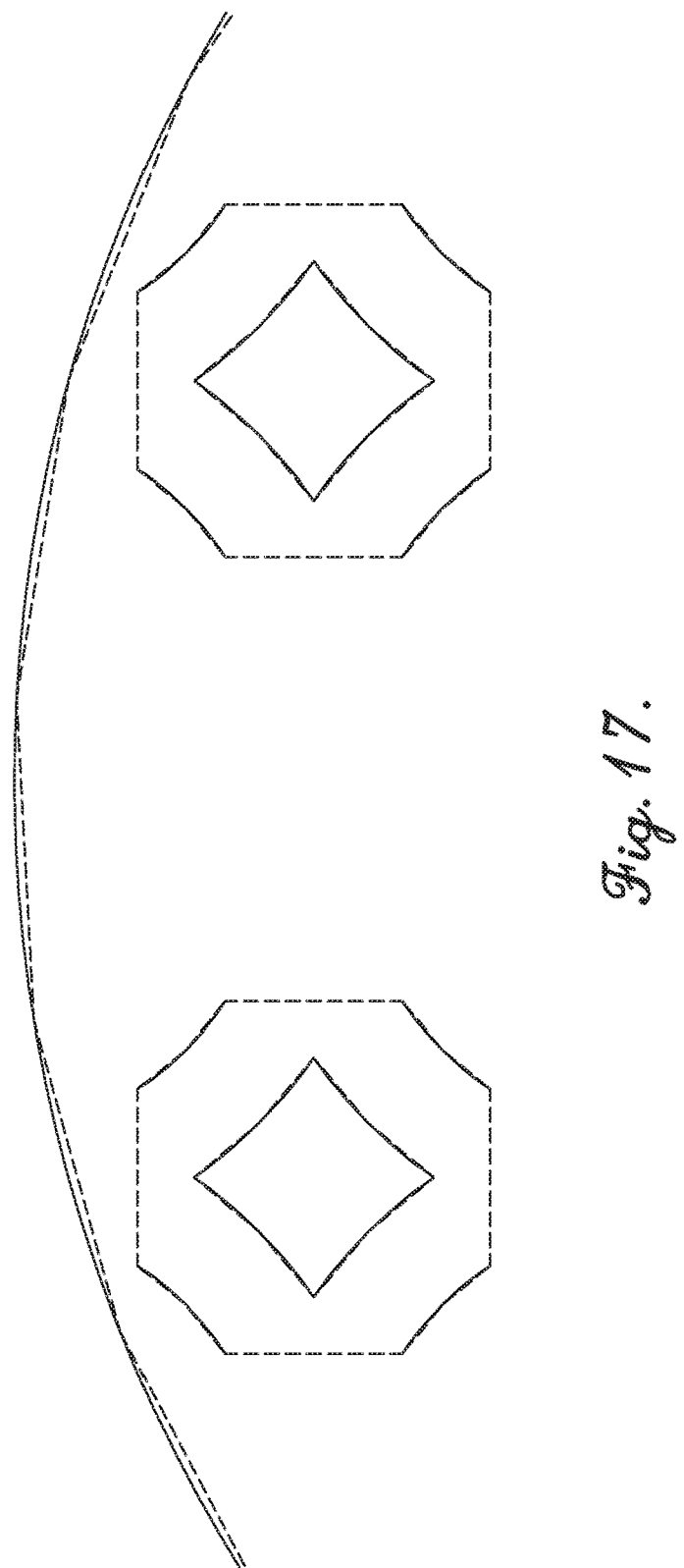

SYSTEMS AND METHODS FOR GENERATING SLICE FILES FROM NATIVE CAD GEOMETRIES

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

FIELD

The present invention relates to systems and methods for improving the production of objects by additive manufacturing processes, and more particularly, to a system and computer-implemented method for generating computer-aided design slice files from native and/or so-called "neutral" computer-aided design geometries for use by additive manufacturing machines in producing objects.

BACKGROUND

Parts, products, and other objects are often rendered with computer-aided design (CAD) models before they are manufactured. These models are often used to produce the objects with additive manufacturing (AM) technologies. Typically, three-dimensional models in the form of triangulated stereolithography (STL) files must be created with CAD software to control the laying down of successive layers of materials to create three-dimensional objects. The STL files are composed of triangles that represent objects' bounding surfaces. Before an STL file can be used it must be checked for errors such as unintentional holes, inconsistent face-normal directions, self-intersections, noise shells, and manifold errors. Once finished, the STL file is processed by "slicer" software which converts the CAD model into a series of offset two-dimensional profiles, called "slices".

The slicing plane is typically defined with two or three points by specifying a major plane of the user coordinate system (UCS), or by selecting a planar or a surface object, but not a mesh. Sliced objects retain the layer and, in some instances, color properties of the original CAD objects, however the resulting surface or slice objects do not retain a history of the original CAD objects. Thus, the CAD model is converted into a triangulated surface mesh, the intersection of each triangle with the desired build-slice plane is determined, resulting in a single line segment per intersected triangle, which together establish the boundaries which describe the region to build. The resulting "slice file" describes each layer of the object to be built.

This current method is not robust or efficient for objects that have fully-defined native CAD models. "Auto" generation of triangle meshes used by most CAD and AM tools produce low quality meshes which may have thousands of errors which adversely affect the AM process. Further, when a CAD model with non-linear features is approximated by linear triangles it is no longer possible to refine the linear surface mesh to increase accuracy, and the original CAD file must be re-meshed with finer resolution. Even options like the Additive Manufacturing File format, defined in ASTM 52915, fail to accurately represent all curved surfaces because these formats may not use the same basis functions to define curvature as does the native CAD model. Additionally, some techniques involve slicing "on the fly", i.e., while printing the object. However, converting to and fixing triangles prior to slicing is time-consuming and can require an hour or more of time between printing successive layers, which significantly slows the AM process, and if the slice file encounters a problem, the AM process may need to be aborted and the material already expended may be wasted.

This background discussion is intended to provide information related to the present invention which is not necessarily prior art.

SUMMARY

Embodiments of the present invention solve the above-described and other problems and limitations by providing a system and computer-implemented method for improving the production of objects by AM processes. More particularly embodiments of the invention provide a system and computer-implemented method for generating CAD design slice files from native CAD geometries (e.g., a proprietary format used in CAD software that directly interfaces with the CAD software's algorithms and codes; for example, an ACIS geometry file) and/or neutral computer-aided design geometries (e.g., an "open-format" that enables conversion between two proprietary formats used in CAD software; for example, a STEP geometry file). Embodiments of the invention eliminate the prior art process of creating STL files and instead build slice files by computing the intersection of the build-slice plane with the native and/or neutral CAD geometries.

An embodiment of the invention is a computer-implemented method for improving the production of an object by an AM machine. The computer-implemented method may broadly comprise the following actions performed by an electronic processing element. A CAD model having a native and/or neutral format may be received. A desired resolution for each of one or more dimensions (in terms of the distance between layers) may be determined. The CAD model may be sliced by determining an intersection of a build-slice plane with the CAD model to create one or more CAD design slice files having a slice format. The CAD design slice files may be evaluated to determine whether the desired resolution has been achieved. If the desired resolution has been achieved, the CAD design slice files may be sent to the AM machine for use in producing the object. If the desired resolution has not been achieved, a new desired resolution may be determined, and the CAD model may be re-sliced.

Another embodiment of the invention is a system for improving the production of an object by an AM machine. The system may broadly include an electronic processing element configured to execute software containing instructions for performing the following actions. A CAD model having a native and/or neutral format may be received. A desired resolution for each of one or more dimensions may be determined. The CAD model may be sliced by determining an intersection of a build-slice plane with the CAD model to create one or more layer files having a slice format. The CAD design slice files may be evaluated to determine whether the desired resolution has been achieved. If the desired resolution has been achieved, the CAD design slice files may be sent to the AM machine for use in producing the object. If the desired resolution has not been achieved, a new desired resolution may be determined, and the CAD model may be re-sliced.

Various implementations of the foregoing embodiments may include any one or more of the following additional features. The native and/or neutral format may include metadata, and the slice format may retain the metadata. The slice format may include point format, edge format, surface format, or volume format or combinations thereof. A cell structure effect and a fill effect may be defined for the CAD design slice files. The CAD design slice files may be saved in the native and/or neutral format in an electronic memory element. Producing the object may include producing a support structure for the object, and the processing element may further perform an analysis of the support structure to predict a distortion during production of the object. Based on this analysis, the processing element may further create a modified CAD model, and use the modified CAD model in place of the original CAD model, including slicing the modified CAD model to create modified CAD design slice files. If the desired resolution has not been achieved, the processing element may combine the CAD design slice files to regenerate the CAD model, determine the new desired resolution, and re-slice the regenerated CAD model.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 7:
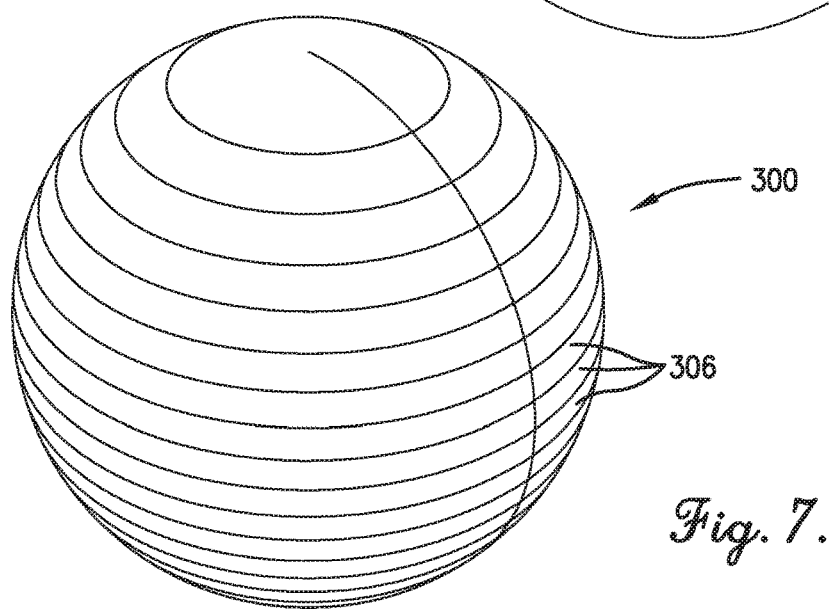
FIG. 7 represents slicing of the CAD geometry of FIG. 5 into a number of sub-volumes.
Figure 8:
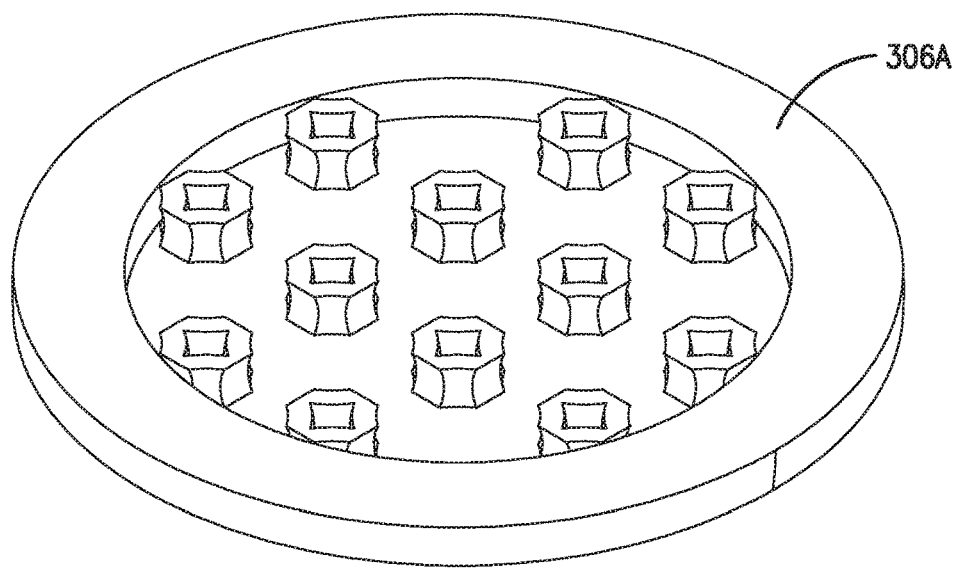
FIG. 8 shows one of the sub-volumes created by the slicing shown in FIG. 7.
Figure 9:
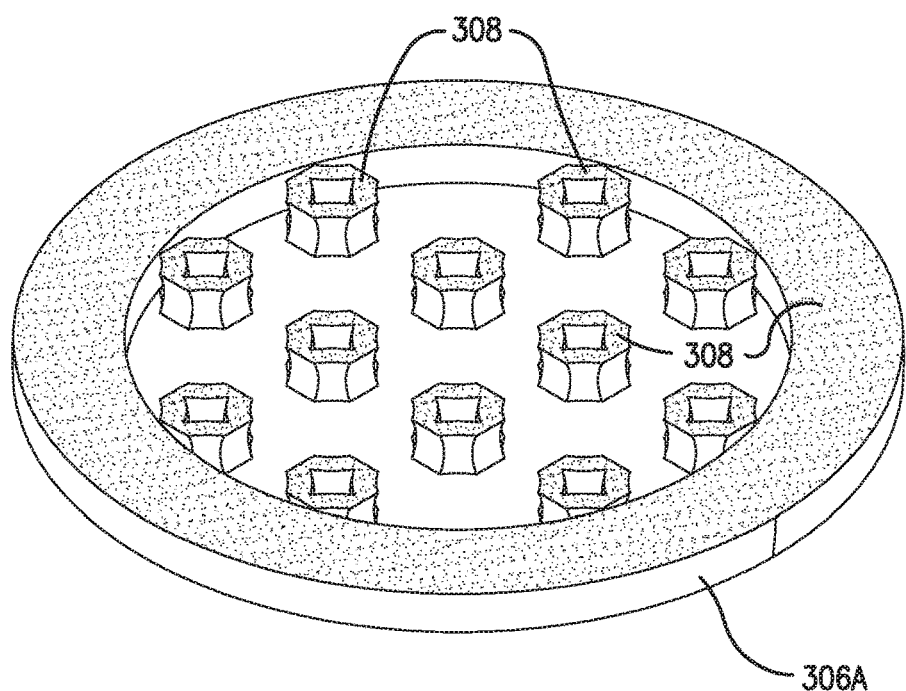
Figure 10:
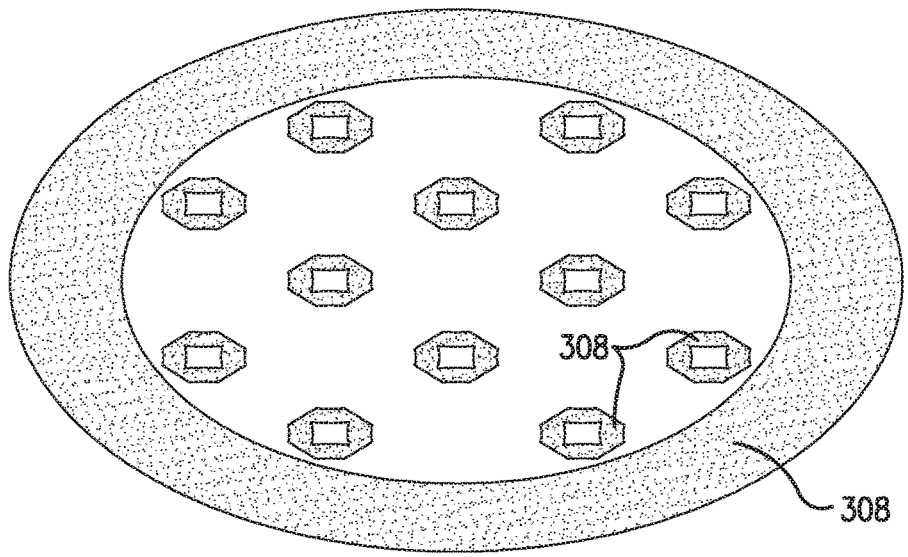
Figure 11:
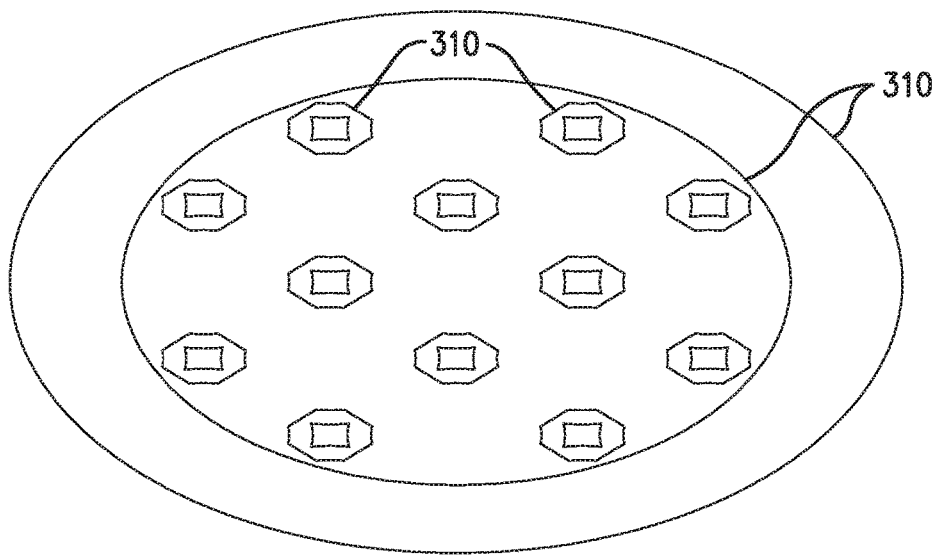
Figure 12:
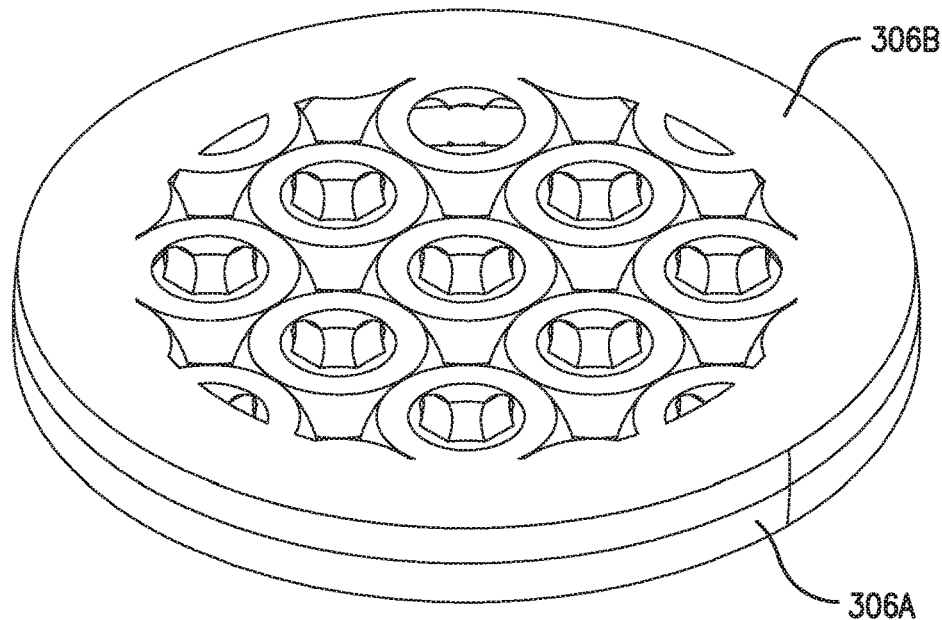
Figure 13:
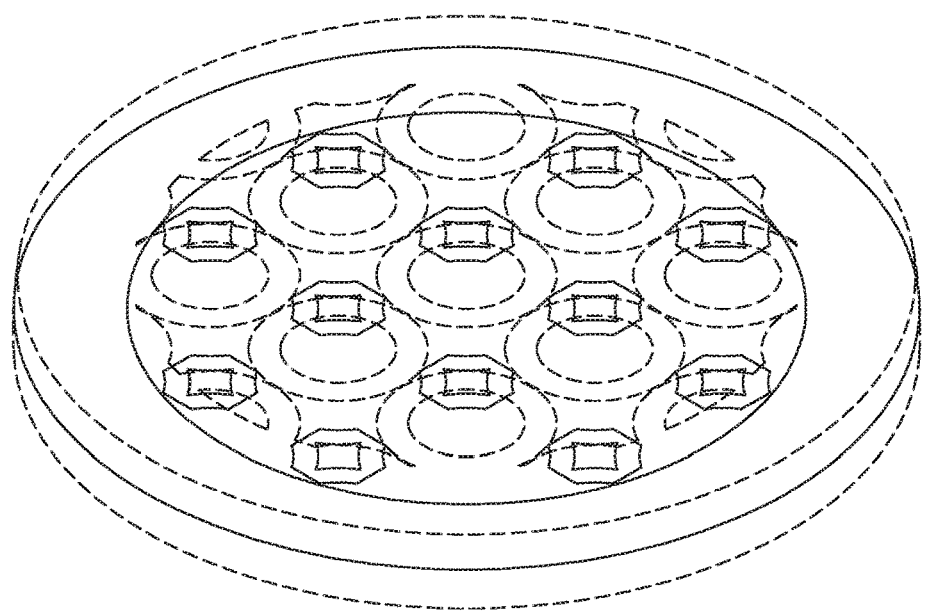
Figure 14:
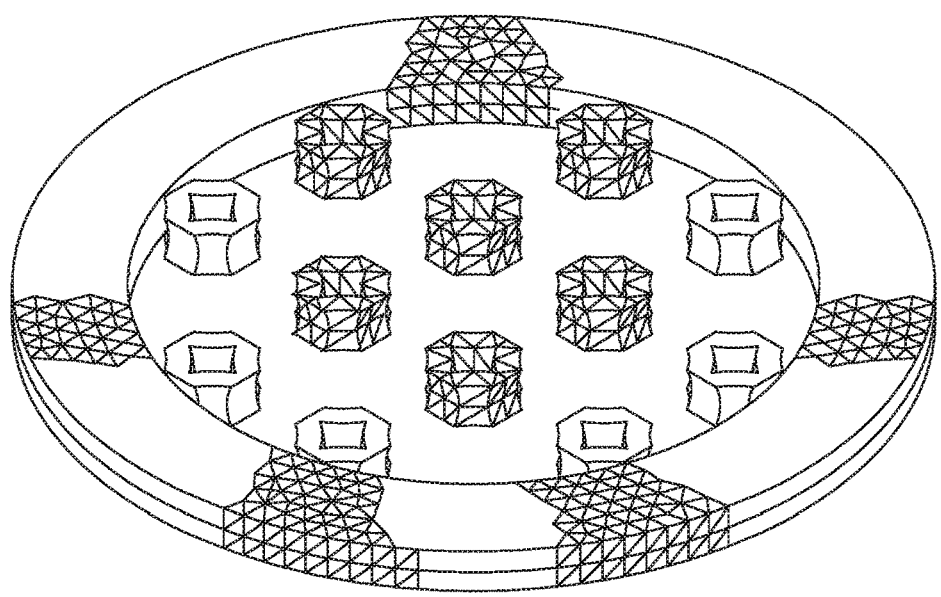
Figure 15:
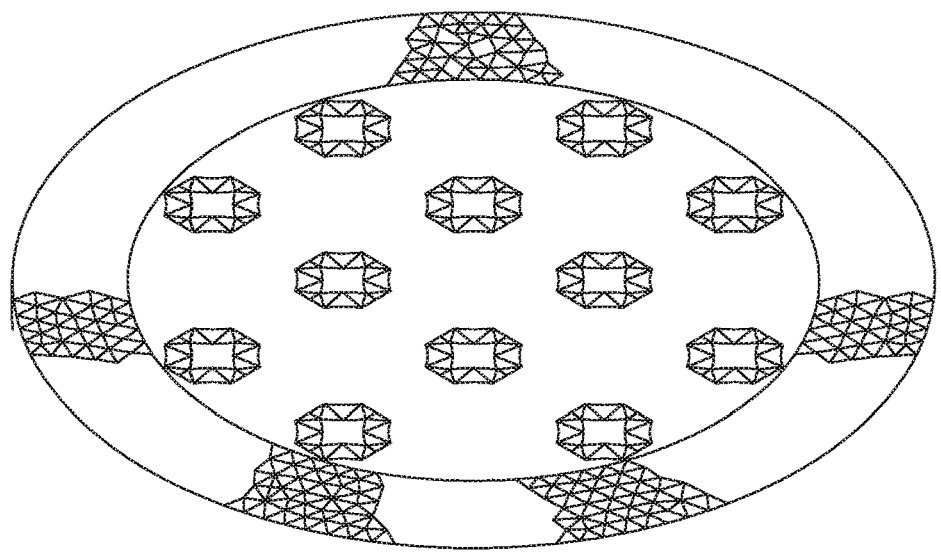
Figure 16:
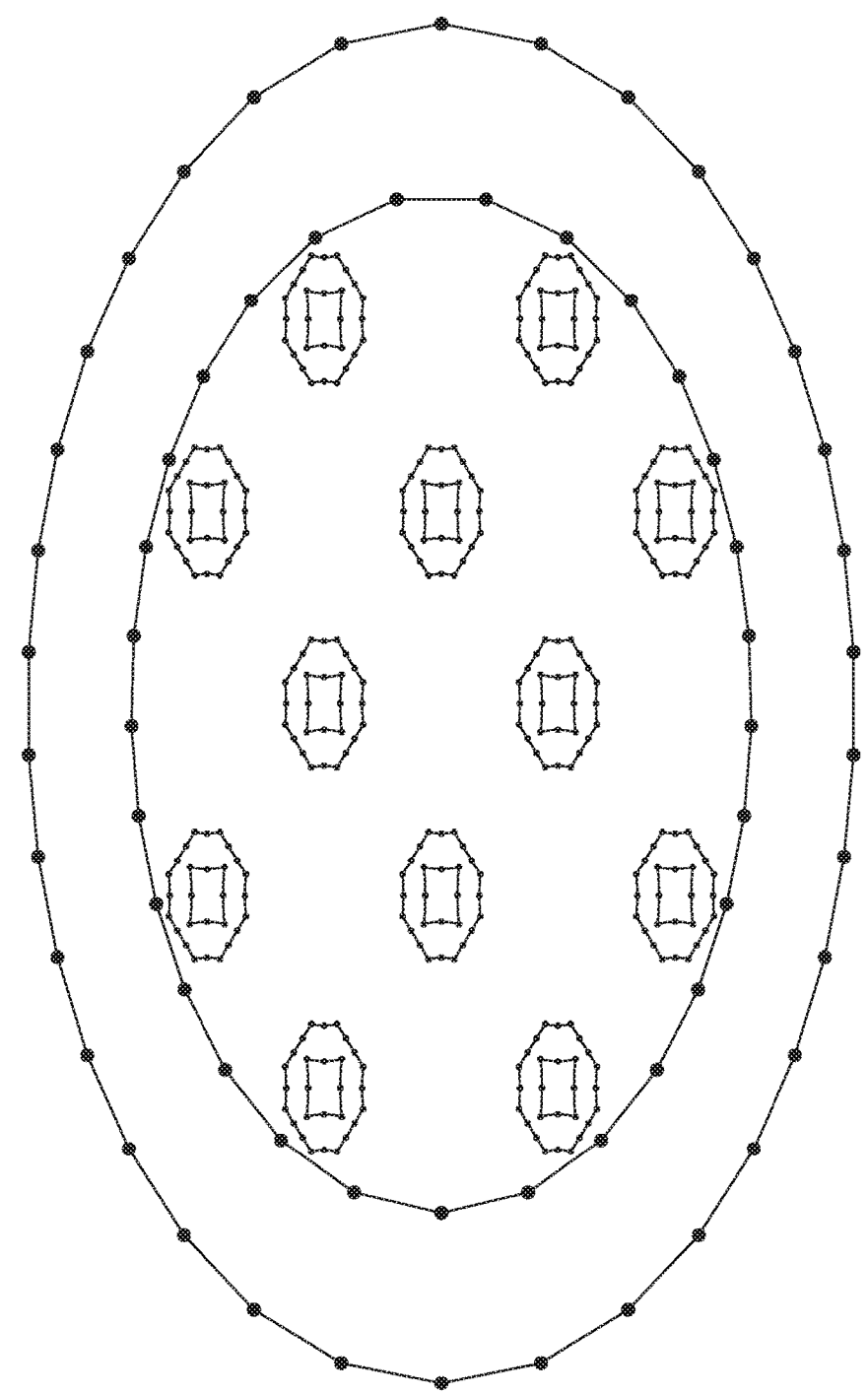
Figure 19:
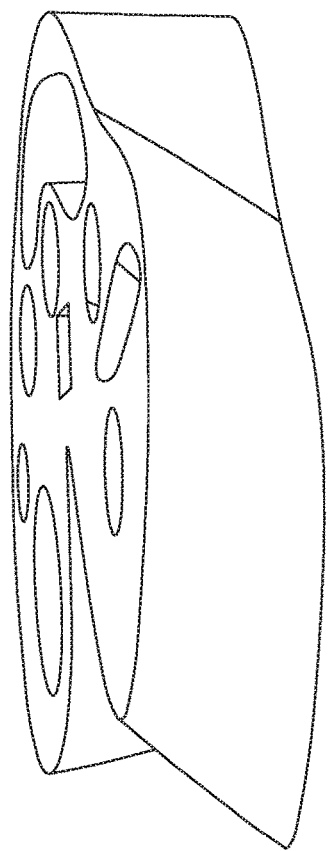
Figure 18:
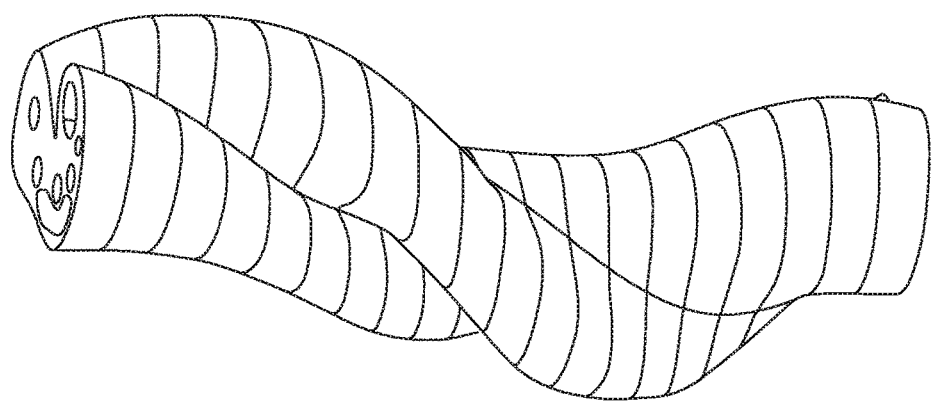
Figure 20:
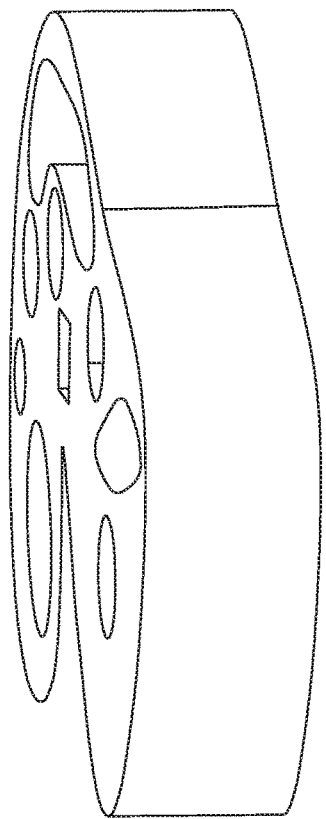
Figure 21:
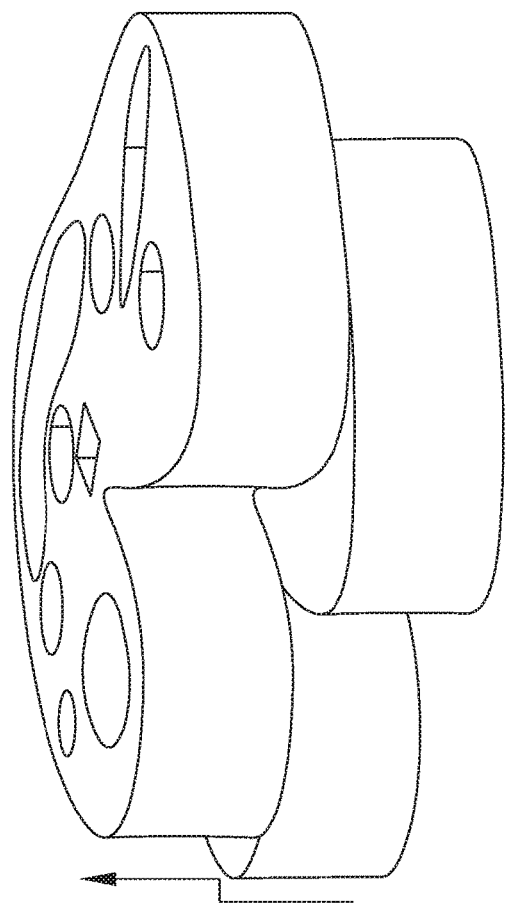

FIG. 9 highlights the upper faces of the sub-volume shown in FIG. 8;

FIG. 10 shows just the upper faces of the sub-volume shown in FIGS. 8 and 9;

FIG. 11 shows just the edges of the upper faces of the sub-volume shown in FIGS. 8 and 9;

FIG. 12 shows two adjacent sub-volumes created by the slicing shown in FIG. 7;

FIG. 13 shows the common faces, edges, and vertices of the adjacent sub-volumes shown in FIG. 12;

FIG. 14 shows a volumetric decomposition that can be generated for one of the sub-volumes created by the slicing shown in FIG. 7;

FIG. 15 shows a surface decomposition that can be generated for one of the sub-volumes created by the slicing shown in FIG. 7;

FIG. 16 shows an approximation edge decomposition that can be generated for one of the sub-volumes created by the slicing shown in FIG. 7;

FIG. 17 compares a portion of the CAD-layer slice file of FIG. 11 with the same portion of the slice file of FIG. 16;

FIG. 18 represents slicing of another CAD geometry into a number of sub-volumes;

FIG. 19 shows one of the sub-volumes created by the slicing shown in FIG. 18;

FIG. 20 shows one of the sub-volumes created by the slicing shown in FIG. 18 in accordance with prior art methods; and FIG. 21 shows two adjacent sub-volumes created by the slicing shown in FIG. 18 in accordance with prior art methods.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular configurations of the present invention can include a variety of combinations and/or integrations of the embodiments described herein.

Broadly characterized, embodiments of the present invention provide a system and computer-implemented method for improving the production of objects with fully defined CAD models by generating CAD design slice files from the native CAD geometry (e.g., a proprietary format used in CAD software that directly interfaces with the CAD software's algorithms and codes; for example, an ACIS geometry file) and/or the neutral CAD geometry (e.g., an "open-format" that enables conversion between two proprietary formats used in CAD software; for example, a STEP geometry file) for use by AM machines. These embodiments advantageously allow for generating slice information from native and/or neutral CAD geometry; avoid time-consuming fixing of inverted normal, intersecting triangles, etc.; allow for build-time evaluation of the CAD design slice files (both "in-plane" and slice thickness) for accuracy requirements; and allow for attaching CAD metadata to the CAD design slice files to facilitate verification and validation of the generated CAD design slice files back to the parent CAD geometry.

The prior art method of linear triangulation prior to slicing is eliminated and, instead, each slice is built by computing the intersection of the build-slice plane with the native and/or neutral CAD geometry. Each slice is an exact description of the geometry on the build plane, that is, the same form of basis function is used as the parent geometry, and can be a group of bounding curves, a group of surfaces, a group of (sub)volumes (or "cells"), or a combination thereof. At build time, these new geometries specified in a "slice file" can be evaluated at parameterized locations based on the desired resolution. Additionally, because the slices are generated from the CAD file, metadata from the CAD file can be "attached" to each slice, which allows for verification and validation of the generated CAD design slice files back to the parent CAD geometry, which meets requirements for a model-based enterprise. While the most common slice file format may be edge definition, sliced CAD format also allows for slice point, surface, and volume definition, which provides additional robustness and increased level of definition for AM technologies.

Figure 1:
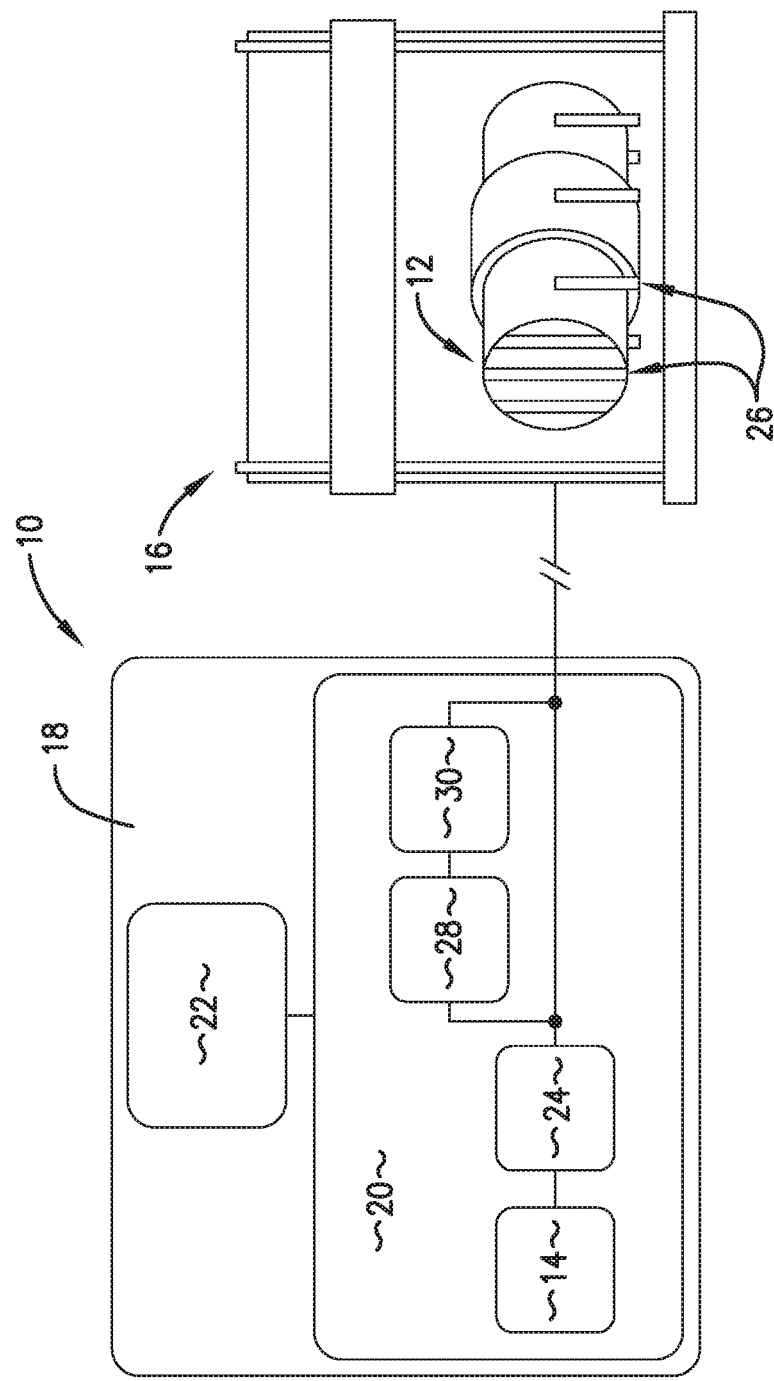
FIG. 1 is a block diagram of an embodiment of a system for improving the production of an object by an AM machine.

Referring to FIG. 1, a system 10 constructed in accordance with an embodiment of the present invention is shown for improving the production of an object 12 with a fully defined CAD model 14 by generating slice data from the native and/or neutral CAD geometry for use by an AM machine 16 in producing the object 12. The system 10 may broadly comprise a computing device 18 including an electronic processing element 20 and an electronic memory element 22.

The electronic processing element 20 may be configured to execute software which includes instructions for performing some or all of the actions associated with the computer-implemented method 110 shown in FIG. 2 and discussed below, which may include accessing data stored in the memory element 22. The electronic memory element 22 may be configured to store data, such as CAD and CAD design slice files, for subsequent access and use by the processing element 20. The memory element 22 may be one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Figure 2:
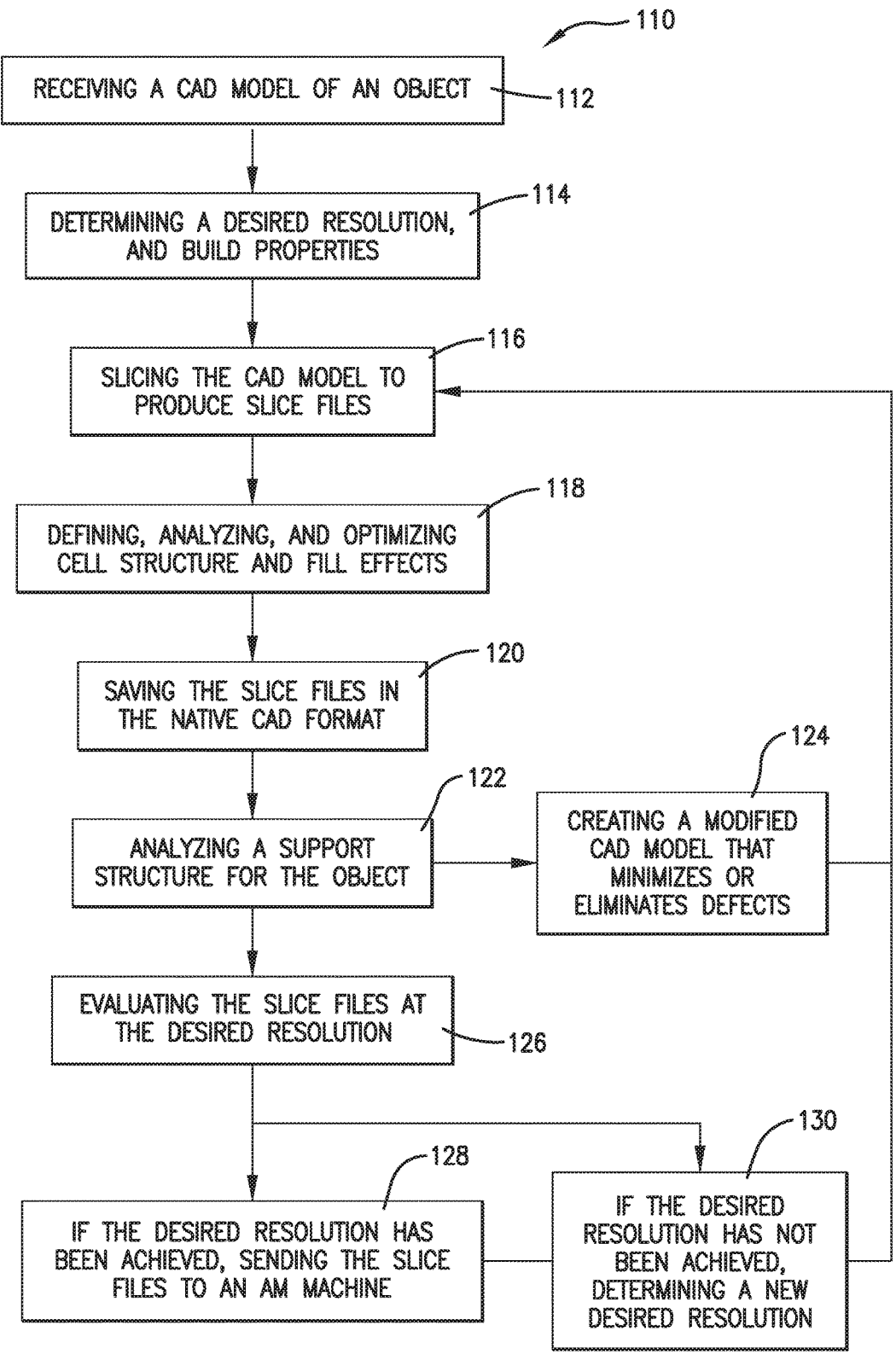
FIG. 2 is a flowchart of steps involved in an embodiment of a computer-implemented method for improving the production of an object by an AM machine.
Figure 3:
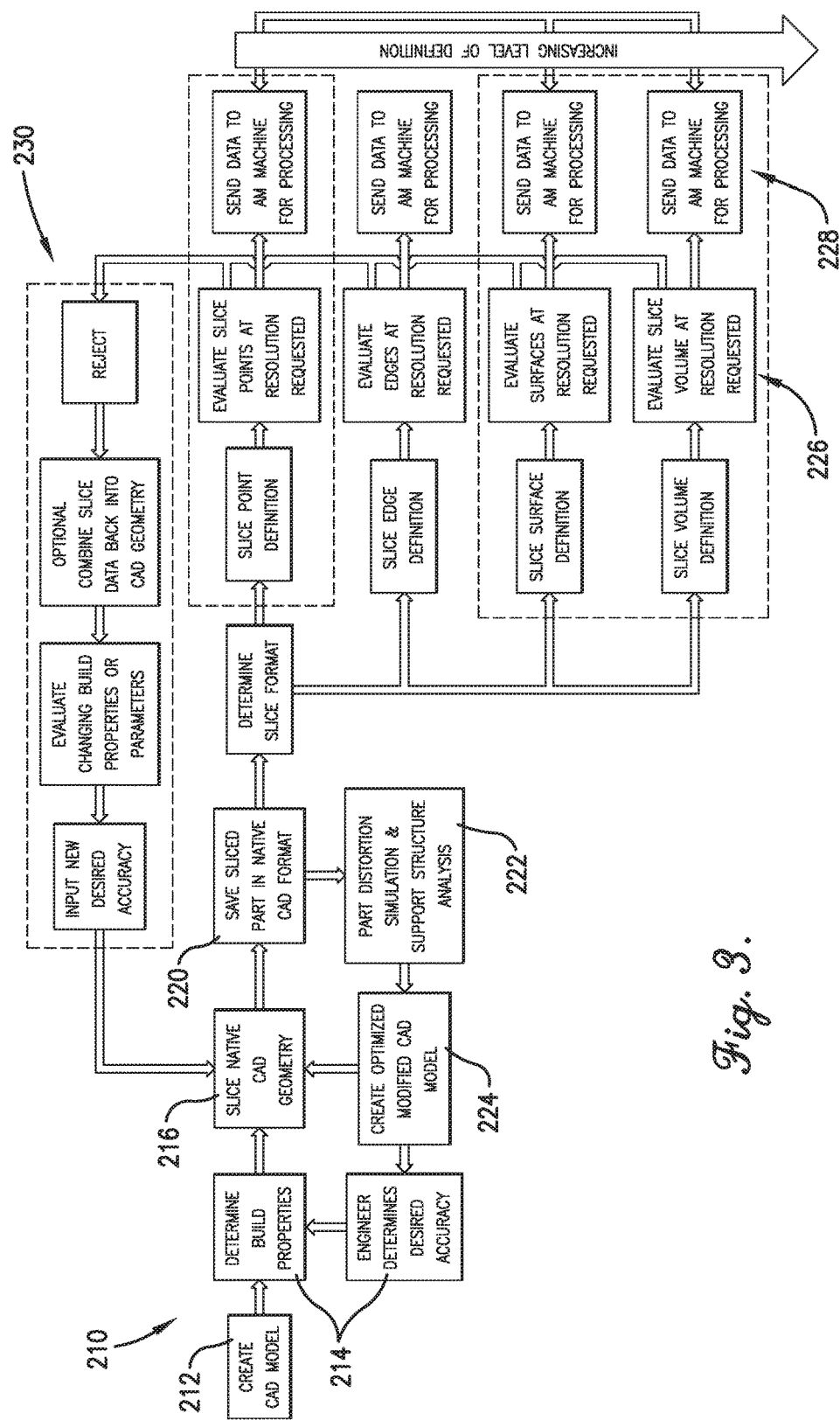
FIG. 3 is a flowchart of steps involved in another embodiment of a computer-implemented method for improving the production of an object by an AM machine.

Referring also to FIG. 2, the computing device 18 may perform the following computer-implemented method 110 in accordance with an embodiment of the present invention without substantial human interaction (beyond the interactions of, e.g., initiating a step, providing a value used by a step, etc.). Referring also to FIG. 3, an alternative computer-implemented 210 is shown in accordance with another embodiment of the present invention, which may be substantially similar to the method 110 except and unless as otherwise noted.

Figure 4:
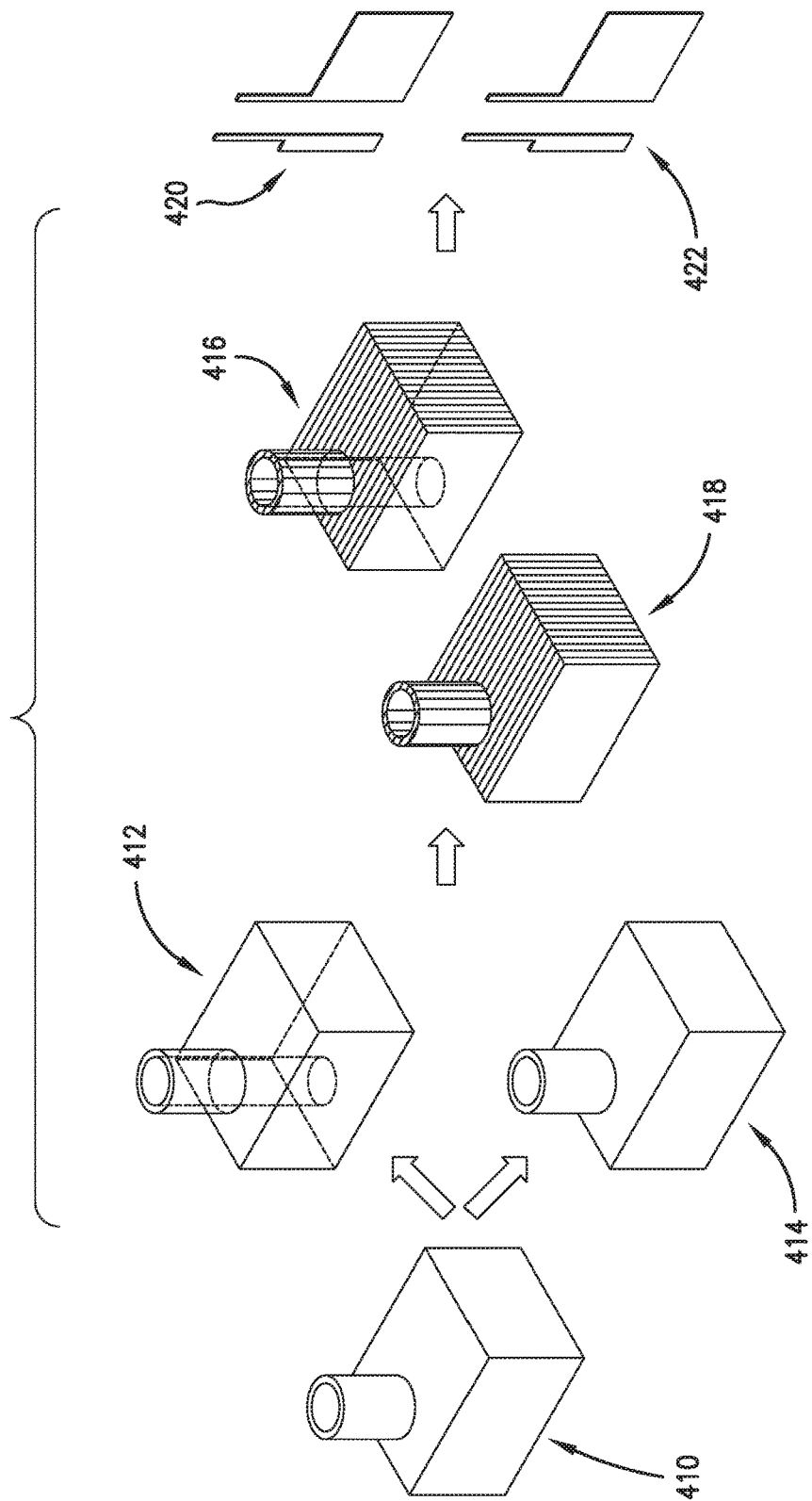
FIG. 4 is a depiction of the processing of a CAD model into slices.

The processing element 20 may receive the fully defined three-dimensional CAD model 14 having a native and/or neutral CAD format, as shown in 112 and 212. Referring also to FIG. 4, the original CAD model 410 may be, for example, an edge-defined model 412 or a surface-defined model 414. The native and/or neutral CAD format may include metadata. The CAD model 14 may be stored in the memory element 22. The processing element 20 may calculate, be provided with, or otherwise determine a desired resolution for each of one or more dimensions (in terms of the distance between layers), as shown in 114 and 214, and one or more build properties, as also shown in 114 and 214.

The processing element 20 may slice the CAD model 14 to produce one or more CAD design slice files 24 containing slice data having a slice format, as shown in 116 and 216. In FIG. 4, the differently defined models are shown sliced 416 and 418, and a single slice 420 and 422 of each is depicted to facilitate understanding. The slice format may be a point, edge, surface, or volume or a combination thereof. The CAD design slice files 24 may retain the metadata of the native and/or neutral CAD format of the CAD model 14, which allows for verification and validation of the generated slice data back to the parent CAD geometry. The processing element 20 may further define, analyze, and optimize a cell structure effect and a fill effect for the CAD design slice files 24, as shown in 118 (not shown but also includable in the method 218). The CAD design slice files 24 may be saved in the native and/or neutral CAD format in the memory element 22, as shown in 120 and 220.

Producing the object 12 may include producing a support structure 26 for the object 12, and the processing element 20 may perform a thermal and mechanical analysis of the support structure 26 at a build-slice level to identify and minimize or eliminate defects so as to minimize or avoid distortion during actual production of the object 12 by the AM machine 16, as shown in 122 and 222. Based on this analysis of the support structure, the processing element 20 may create a modified CAD model 28, and may use this modified CAD model 28 in place of the original CAD model 14, as shown in 124 and 224, including slicing the modified CAD model 28 to produce modified CAD design slice files 30 including modified slice data having the slice format. This ability is enabled by the slice definition.

The processing element 20 may evaluate the slice data in the CAD design slice files 24 at the desired resolution to determine whether the desired resolution has been achieved, as shown in 126 and 226. If the desired resolution has been achieved, the processing element 20 may send the CAD design slice files 24 to the AM machine 16 for processing and use in producing the object 12, as shown in 128 and 228. This may involve converting the CAD slice files 24 to a format useable by the AM machine 16. If the desired resolution has not been not achieved, the processing element 20 may calculate, be provided with, or otherwise determine a new desired resolution and re-slice the CAD model 14, as shown in 130 and 230. In one implementation, this may involve combining the slice data in the CAD design slice files 24 to regenerate the original CAD model 14, determining a new desired resolution, slicing the regenerated CAD model, repeating the subsequent steps using the new desired resolution. This is possible because of the robust definition derived from the sliced geometry so that the format quality of the slice definition allows the CAD geometry to be regenerated.

In an exemplary implementation, the script for performing some or all of these actions may be written using the Python™ programming language in combination with the Abaqus FEA finite element analysis package to create a common layer interface (CLI) AM slice file for CAD geometry.

Practical applications and variations of embodiments of the present invention may include slices containing groups of bounding curves, groups of surfaces, or groups of volumes or combinations thereof; AM support structures defined by native and/or neutral CAD geometry sliced along with the objects; double or variable precision algorithms and data formats; and symbolic computation algorithms and data formats.

Exemplary applications of the above-described system 10 and method 110 will now be described with reference to FIGS. 5-22. The invention is not limited to these illustrated exemplary applications.

Figure 5:
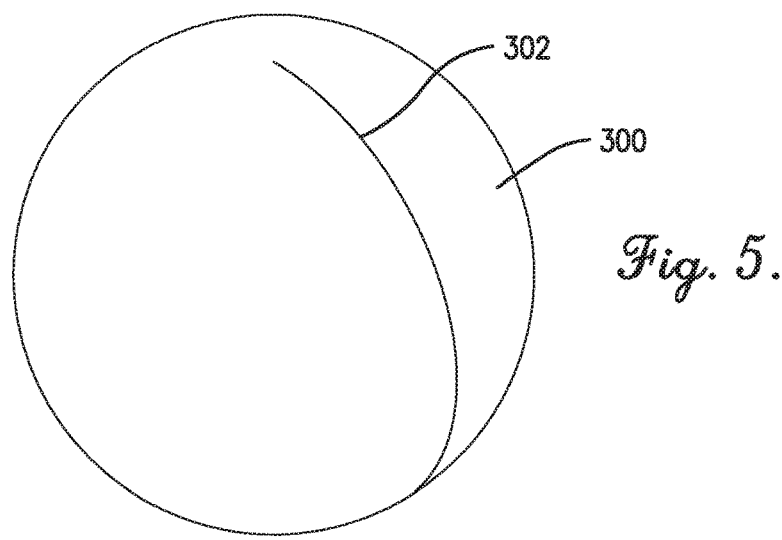
FIG. 5 represents a CAD geometry of an exemplary part to be produced by an AM machine, with the black curved line being a part of the CAD geometry's description.
Figure 6:
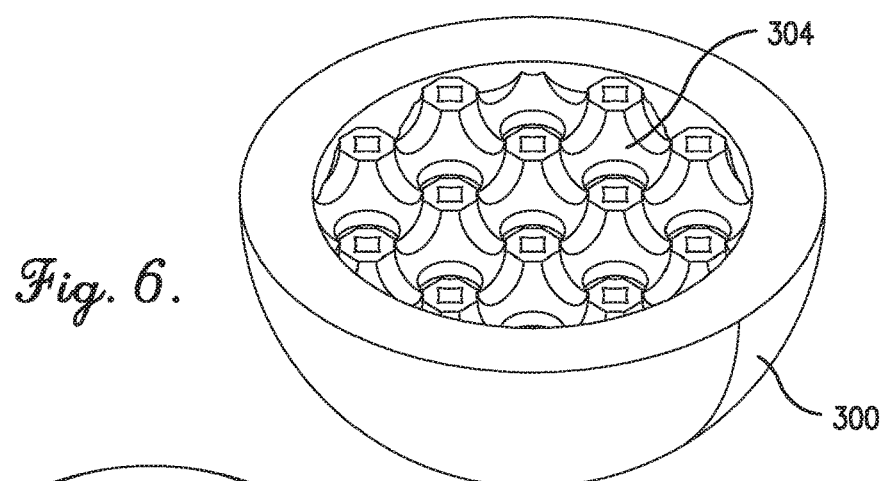
FIG. 6 shows a part of the CAD geometry of FIG. 5. with internal features revealed.

FIG. 5 represents a CAD geometry 300 of an exemplary part to be produced by an AM machine, with the black curved line 302 being a part of the CAD geometry's description. FIG. 6 shows a portion of the CAD geometry 300 with internal features 304 revealed.

FIG. 7 represents slicing of the CAD geometry 300 into a number of sub-volumes 306. FIG. 8 shows one of the sub-volumes 306A created by the slicing. A CAD slice file is created for the sub-volume 306A by computing the intersection of the build-slice plane with the parent CAD geometry. CAD meta-data may be attached to the CAD slice file to allow for verification and validation of the generated CAD slice file back to the original or parent CAD geometry.

FIG. 9 highlights the upper faces 308 of the sub-volume 306A. FIG. 10 shows just the upper faces 308 of the sub-volume 306A. FIG. 11 shows the edges 310 of the upper faces 308.

FIG. 12 shows two adjacent sub-volumes 306A and 306B created by the slicing shown in FIG. 7. FIG. 13 shows the common faces, edges, and vertices of the adjacent sub-volumes 306A and 306B, with the sub-volumes 306A and 306B shown in dashed lines.

FIG. 14 shows a volumetric decomposition that can be generated for one of the sub-volumes created by the slicing shown in FIG. 7. The volumetric decomposition may be generated via generating a linear tetrahedral finite element mesh on the sub-volume from the CAD slice if needed for AM printing. Some AM printers may be able to use this format directly.

FIG. 15 shows a surface decomposition that can be generated for one of the sub-volumes created by the slicing shown in FIG. 7. The surface decomposition may be generated via a linear triangular finite element mesh on the sub-volume's upper faces from the CAD slice if needed for AM printing. Some AM printers may be able to use this format directly.

FIG. 16 shows an edge decomposition that can be generated for one of the sub-volumes created by the slicing shown in FIG. 7. FIG. 17 compares a portion of the CAD-layer slice file of FIG. 11 with the same portion of the slice file of FIG. 16.

FIG. 18 represents slicing of another CAD geometry into a number of sub-volumes. Curvature is captured through each layer's thickness because the invention uses the original CAD representation. In contrast, prior art methods don't include curvature, but instead a 2-d profile is extruded perpendicularly—resulting in a stair-step-like slice definition.

FIG. 19 shows one of the sub-volumes created by the slicing shown in FIG. 18. Again, notice the curvature captured through this layer's thickness because of the use of the original CAD representation.

FIG. 20 shows one of the sub-volumes created by the slicing shown in FIG. 18 in accordance with prior art methods. The prior art effectively converts the continuous geometry into "blocky" or "stepped" geometry as shown.

FIG. 21 shows two adjacent sub-volumes created by the slicing shown in FIG. 18 in accordance with prior art methods. Again, the prior art effectively converts the continuous geometry into "blocky" or "stepped" geometry as shown.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented method for improving the production of an object by an additive manufacturing machine, the computer implemented method comprising:
performing with an electronic processing element the actions of—
receiving a computer-aided design model having a native and/or neutral format,
determining a desired resolution for each of one or more dimensions,
slicing the computer-aided design model by determining an intersection of a build-slice plane with the computer-aided design model to create one or more computer-aided design slice files having a slice format,
evaluating the one or more computer-aided design slice files to determine whether the desired resolution has been achieved,
if the desired resolution has been achieved, sending the one or more computer-aided design slice files to the additive manufacturing machine for use in producing the object, and
if the desired resolution has not been achieved, determining a new desired resolution and re-slicing the computer-aided design model; and
producing the object with the additive manufacturing machine using the one or more computer-aided design slice files received from the electronic processing element.

2. The computer-implemented method as set forth in claim 1, wherein the native and/or neutral format includes metadata, and the slice format retains the metadata.

3. The computer-implemented method as set forth in claim 1, wherein the slice format is selected from the group consisting of point format, edge format, surface format, volume format, and combinations thereof.

4. The computer-implemented method as set forth in claim 1, further including defining a cell structure effect and a fill effect for the one or more computer-aided design slice files.

5. The computer-implemented method as set forth in claim 1, further including saving in an electronic memory element the one or more computer-aided design slice files in the native and/or neutral format.

6. The computer-implemented method as set forth in claim 5, wherein producing the object includes producing a support structure for the object, and the electronic processing element further performing an analysis of the support structure to predict a distortion during production of the object.

7. The computer-implemented method as set forth in claim 5, wherein based on the analysis of the support structure, the electronic processing element further performs the actions of—
creating a modified computer-aided design model; and
using the modified computer-aided design model in place of the computer-aided design model, including slicing the modified computer-aided design model to create one or more modified computer-aided design slice files.

8. The computer-implemented method as set forth in claim 1, wherein if the desired resolution has not been achieved, the electronic processing element further performs the actions of—
combining the one or more computer-aided design slice files to regenerate the computer-aided design model;
determining the new desired resolution; and
re-slicing the regenerated computer-aided design model.

9. A computer-implemented method for improving the production of an object by an additive manufacturing machine, the computer implemented method comprising:

performing with an electronic processing element the actions of—
receiving a computer-aided design model having a native or neutral format, wherein the native and/or neutral format includes metadata,
determining a desired resolution for each of one or more dimensions,
determining one or more build properties,
slicing the computer-aided design model by determining an intersection of a build-slice plane with the CAD model to create one or more computer-aided design slice files having a slice format, wherein the slice format retains the metadata from the native and/or neutral format, and wherein the slice format is selected from the group consisting of point format, edge format, surface format, volume format, and combinations thereof,
evaluating the one or more computer-aided design slice files to determine whether the desired resolution has been achieved,
if the desired resolution has been achieved, sending the one or more computer-aided design slice files to the additive manufacturing machine for use in producing the object, and
if the desired resolution has not been achieved, determining a new desired resolution and re-slicing the computer-aided design model; and
producing the object with the additive manufacturing machine using the one or more computer-aided design slice files received from the electronic processing element.

10. The computer-implemented method as set forth in claim 9, further including saving in an electronic memory element the one or more computer-aided design slice files in the native and/or neutral format.

11. The computer-implemented method as set forth in claim 10, wherein producing the object includes producing a support structure for the object, and the electronic processing element further performs an analysis of the support structure to predict a distortion during production of the object, and based on the analysis of the support structure, the electronic processing element further performs the actions of—
creating a modified computer-aided design model; and
using the modified computer-aided design model in place of the computer-aided design model, including slicing the modified computer-aided design model to create one or more modified computer-aided design slice files.

12. The computer-implemented method as set forth in claim 9, wherein if the desired resolution has not been achieved, the electronic processing element further performs the actions of—
combining the one or more computer-aided design slice files to regenerate the computer-aided design model;
determining a new desired resolution; and
re-slicing the regenerated computer-aided design model.

13. A system for improving the production of an object by an additive manufacturing machine, the system comprising:
an electronic processing element configured to execute software containing instructions for—
receiving a computer-aided design model having a native and/or neutral format,
determining a desired resolution for each of one or more dimensions,
slicing the computer-aided design model by determining an intersection of a build-slice plane with the CAD model to create one or more computer-aided design slice files having a slice format,
evaluating the one or more computer-aided design slice files to determine whether the desired resolution has been achieved,
if the desired resolution has been achieved, sending the one or more computer-aided design slice files to the additive manufacturing machine for use in producing the object, and
if the desired resolution has not been achieved, determining a new desired resolution and re-slicing the computer-aided design model; and
an additive manufacturing machine configured to produce the object using the one or more computer-aided design slice files received from the electronic processing element.

14. The system as set forth in claim 13, wherein the native and/or neutral format includes metadata, and the slice format retains the metadata.

15. The system as set forth in claim 13, wherein the slice format is selected from the group consisting of point format, edge format, surface format, volume format, and combinations thereof.

16. The system as set forth in claim 13, further including defining a cell structure effect and a fill effect for the one or more computer-aided design slice files.

17. The system as set forth in claim 13, further including saving in an electronic memory element the one or more computer-aided design slice files in the native and/or neutral format.

18. The system as set forth in claim 17, wherein producing the object includes producing a support structure for the object, and the electronic processing element further performing an analysis of the support structure to predict a distortion during production of the object.

19. The system as set forth in claim 18, wherein based on the analysis of the support structure, the electronic processing element further performs the actions of—
creating a modified computer-aided design model; and
using the modified computer-aided design model in place of the computer-aided design model, including slicing the modified computer-aided design model to create one or more modified computer-aided design slice files.

20. The system as set forth in claim 13, wherein if the desired resolution has not been achieved, the electronic processing element further performs the actions of—
combining the one or more computer-aided design slice files to regenerate the computer-aided design model;
determining the new desired resolution; and
re-slicing the regenerated computer-aided design model.

* * * * *